United States Patent
Finnerty et al.

(10) Patent No.: US 10,391,464 B2
(45) Date of Patent: Aug. 27, 2019

(54) CENTRIFUGAL BLOWER SYSTEM WITH INTERNAL GAS MIXING AND GAS PHASE CHEMICAL REACTOR INCORPORATING SAME

(71) Applicant: Watt Fuel Cell Corp., Mount Pleasant, PA (US)

(72) Inventors: Caine M. Finnerty, Mount Pleasant, PA (US); Paul DeWald, Scottdale, PA (US)

(73) Assignee: WATT FUEL CELL CORP., Mount Pleasant, PA (US)

( * ) Notice: Subject to any disclaimer, the term of this patent is extended or adjusted under 35 U.S.C. 154(b) by 59 days.

(21) Appl. No.: 15/557,699

(22) PCT Filed: Mar. 16, 2015

(86) PCT No.: PCT/US2015/020707
§ 371 (c)(1),
(2) Date: Sep. 12, 2017

(87) PCT Pub. No.: WO2016/148681
PCT Pub. Date: Sep. 22, 2016

(65) Prior Publication Data
US 2018/0050907 A1    Feb. 22, 2018

(51) Int. Cl.
*B01J 4/00*      (2006.01)
*F04D 17/16*   (2006.01)
(Continued)

(52) U.S. Cl.
CPC .............. *B01J 4/008* (2013.01); *B01F 3/024* (2013.01); *B01F 3/026* (2013.01); *B01F 5/0473* (2013.01); *B01F 7/163* (2013.01);

*B01F 15/00136* (2013.01); *B01F 15/00149* (2013.01); *B01J 4/005* (2013.01); *C01B 3/38* (2013.01); *C01B 3/386* (2013.01); *F04D 17/16* (2013.01); *F04D 17/164* (2013.01); *F04D 25/0606* (2013.01); *F04D 25/166* (2013.01);
(Continued)

(58) Field of Classification Search
CPC ....... B01J 4/005; B01J 4/008; F04D 25/0606; F04D 29/667; F04D 17/16; F04D 17/164; C01B 3/03; C01B 3/386; C01B 2203/0233; C01B 2203/0244; C01B 2203/066; C01B 2203/0283; C01B 2203/0261; C01B 2203/0205; B01F 15/00149; B01F 5/0473; B01F 7/163; B01F 3/026; B01F 3/024; B01F 15/00136; B01F 2215/0036; H01M 8/0618
See application file for complete search history.

(56) References Cited

U.S. PATENT DOCUMENTS 3,830,041 A    8/1974    Huppke
5,298,155 A    3/1994    Sabottke
(Continued)

FOREIGN PATENT DOCUMENTS

JP    2005186203 A    7/2005
JP    2008007372 A    1/2008
(Continued)

*Primary Examiner* — Lessanework Seifu
(74) *Attorney, Agent, or Firm* — Dilworth & Barrese, LLP.; Michael J. Musella, Esq.

(57) ABSTRACT

A centrifugal blower system has internal gas mixing capability.

20 Claims, 4 Drawing Sheets

(51) Int. Cl.
  *F04D 25/16* (2006.01)
  *F04D 29/42* (2006.01)
  *H01M 8/0612* (2016.01)
  *B01F 5/04* (2006.01)
  *B01F 7/16* (2006.01)
  *B01F 15/00* (2006.01)
  *B01F 3/02* (2006.01)
  *C01B 3/38* (2006.01)
  *F04D 25/06* (2006.01)
  *F04D 29/66* (2006.01)

(52) U.S. Cl.
  CPC ....... *F04D 29/4226* (2013.01); *F04D 29/667* (2013.01); *H01M 8/0618* (2013.01); *B01F 2215/0036* (2013.01); *C01B 2203/0205* (2013.01); *C01B 2203/0233* (2013.01); *C01B 2203/0244* (2013.01); *C01B 2203/0261* (2013.01); *C01B 2203/0283* (2013.01); *C01B 2203/066* (2013.01)

(56) References Cited

U.S. PATENT DOCUMENTS

| | | |
|---|---|---|
| 6,116,027 A | 9/2000 | Smith et al. |
| 2008/0173585 A1 | 7/2008 | White et al. |
| 2009/0188165 A1 | 7/2009 | Ariyapadi |
| 2012/0328969 A1* | 12/2012 | DeWald ................ F04D 25/166 429/455 |

FOREIGN PATENT DOCUMENTS

| | | |
|---|---|---|
| WO | 2001075277 A1 | 10/2001 |
| WO | 2012177494 A1 | 12/2012 |
| WO | 2013/022682 A1 | 2/2013 |

* cited by examiner

*FIG. 2 Blower Control*
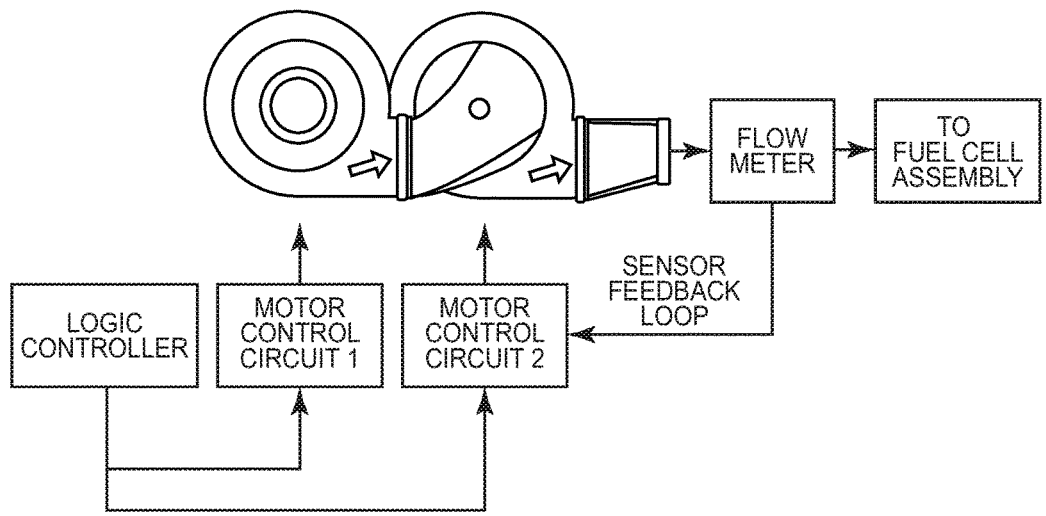
*FIG. 3 Control Logic Diagram*
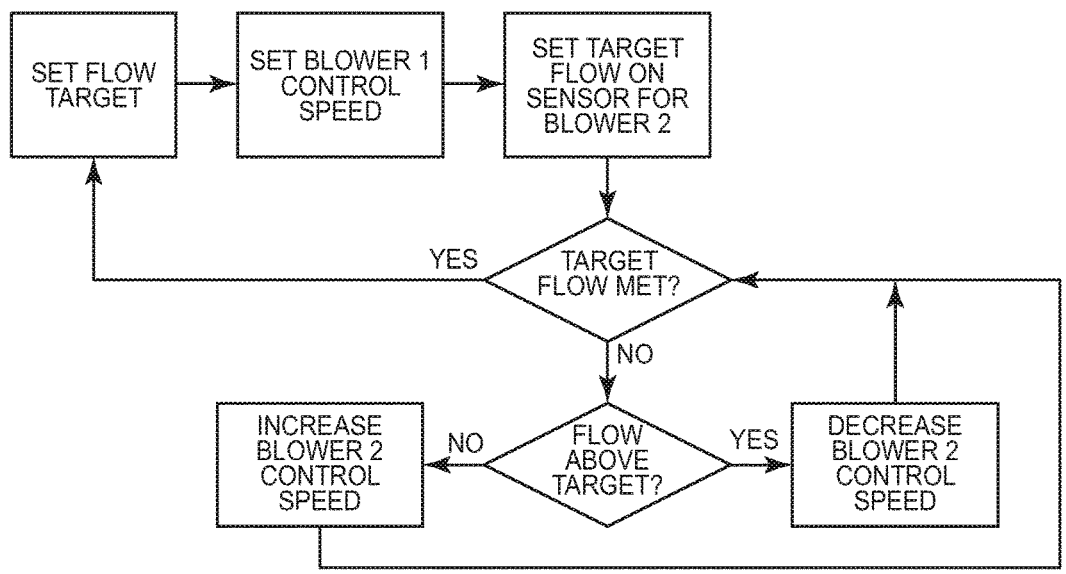

CENTRIFUGAL BLOWER SYSTEM WITH INTERNAL GAS MIXING AND GAS PHASE CHEMICAL REACTOR INCORPORATING SAME

BACKGROUND OF THE INVENTION

This invention relates to centrifugal blowers and to chemical reactors incorporating same.

Centrifugal blowers, or centrifugal fans, are a well known type of device for providing a flow or movement of a gaseous medium. A common type of centrifugal blower includes a housing having an axially directed gas inlet and a radially directed gas outlet, an impeller disposed within the housing for drawing gas at a first pressure into the inlet and expelling gas at a second higher pressure through the outlet and a motor for driving, i.e., spinning, the impeller. Variations of this general type of centrifugal blower are disclosed in, e.g., U.S. Pat. Nos. 4,917,572; 5,839,879; 6,877,954; 7,061,758; 7,351,031; 7,887,290; 7,891,942, and, U.S. 2006/0051203, the entire contents of which are incorporated by reference herein.

Centrifugal blowers of the general type referred to above have been disclosed as components of gas phase chemical reactors of various kinds including reformers (devices for converting liquid and gaseous reformable fuels to hydrogen-rich products), fuel cells (devices for the electrochemical conversion of electrochemically oxidizable fuels such as the hydrogen-rich product of a reformer to electricity and potentially useful recoverable heat), integrated reformer-fuel cell systems, fluidized bed reactors for gas phase olefin polymerization, catalytic combustors, gas-liquid circulating gas hydrate reactors, gas phase oxidation reactors and water-gas shift reactors where the blowers perform gas-driving operations essential to their operation. For example, in the case of a partial oxidation reformer, a centrifugal blower is commonly employed to provide a flow of oxygen-containing gas such as air to a mixing zone where the gas combines with a gaseous or vaporized liquid reformable fuel to form a gaseous partial oxidation reaction mixture. The same centrifugal blower also drives the gaseous reaction mixture into a gas phase partial oxidation reaction zone where the mixture undergoes conversion to a hydrogen-rich reformate, and the resulting product reformate therefrom.

DeWald et al. us 2012/0328969, the entire contents of which are incorporated by reference herein, describes a blower system comprising a series of interconnected, independently controllable centrifugal blower units in which gaseous discharge from the radial outlet of one blower in the series is introduced into the axial inlet of another blower unit in the series via a duct connecting both blower units.

The centrifugal blower system of US 2012/0328969 possesses several advantages over conventional and otherwise known single centrifugal blowers such as those mentioned above, particularly in the ability to make rapid and accurate gas flow adjustments in response to frequently changing gas flow requirements for the gas phase chemical reactor to which the blower is connected, e.g., as in the reformers and integrated reformer and fuel cell assemblies disclosed in Finnerty et al. U.S. patent application Ser. Nos. 14/533,702 and 14/533,803, both filed Nov. 5, 2014, and Ser. Nos. 14/534,345 and 14/534,409, both filed Nov. 6, 2014, the entire contents of which are incorporated by reference herein.

In known and conventional centrifugal blowers that are utilized for driving gaseous reactant mixtures into, within and from the gas phase reaction zone of a chemical reactor, the blower provides a flow of first reactant gas which combines with a flow of second reactant gas external to the blower to provide a gaseous reaction mixture which is then introduced to the reaction zone. In order to mix the first and second gases more thoroughly than could be expected to occur simply through turbulent mixing that takes place upon merger of the two gas streams, a mixing device such as a static or power-driven mixer may be utilized to accomplish this objective. However, the degree of mixing that can be achieved with such a mixing device, while an improvement over mere turbulent mixing, may still be well short of optimum (especially in the case of a static mixer), introduces further structural complexity (especially in the case of a power-driven mixer) and in any case may cause an undesirable level of back pressure.

There is thus a need for a centrifugal blower or centrifugal blower system for driving gaseous mixtures that avoids the use of an external mixing device to provide a more uniform mixture of two or more gases than can be achieved by turbulent mixing alone.

SUMMARY OF THE INVENTION

In accordance with this invention, there is provided a centrifugal blower system for driving gaseous flow, the centrifugal blower system comprising:

a) a series of blower units, each blower unit in the series comprising a casing having an axial inlet and a radial outlet, an impeller disposed within the casing for drawing a gaseous medium at a first pressure into the axial inlet and expelling gaseous medium at a second higher pressure through the radial outlet and a motor for driving the impeller;

b) a duct having a first end connected to the radial outlet of a blower unit in the series, a second end connected to the axial inlet of another blower unit in the series, and a gas flow-confining wall defining an internal gas flow passageway; and, c) a gas flow inlet for admitting a gaseous medium to the gas flow passageway of duct (b), the gas flow inlet being defined in or connected to the gas flow-confining wall of duct (b).

Provision of gas flow inlet (c) allows for the substantially uniform mixing of separate gas streams within the centrifugal blower system herein, an arrangement presenting several important advantages over a similar centrifugal blower system but one lacking gas flow inlet (c). In the case of the former and in contrast to the latter, mixing of separate gas streams within the blower system of the present teachings renders superfluous gas mixing means downstream from the blower outlet thereby simplifying the structure to which the blower outlet may be connected. In addition, the centrifugal blower system herein, in dispending with external gas mixing means that might produce an undesirable increase in back pressure within a gas flow-utilization device, e.g., a gas phase chemical reactor, eliminates a source of gas flow obstruction that could impede free gaseous flow.

These and other novel features and advantages of the centrifugal blower system herein with its capability for internal mixing of separate gas streams, and gas phase chemical reactors incorporating such centrifugal blower system to drive gaseous flow therein, will become more apparent from the following detailed description and accompanying drawings.

BRIEF DESCRIPTION OF THE DRAWINGS

In should be understood that the drawings described below are for illustration purposes only. The drawings are not necessarily to scale, with emphasis generally being placed upon illustrating the principles of the present teachings. The drawings are not intended to limit the scope of the present teachings in any way. Like numerals generally refer to like parts.

FIG. 2 is a diagrammatic illustration of a blower control system for controlling the operation of a centrifugal blower system in accordance with the present teachings such as that illustrated in FIGS. 1A-1D.

FIG. 3 is a logic flow diagram for the blower control system of FIG. 2.

DETAILED DESCRIPTION OF THE INVENTION

Figure 1A:
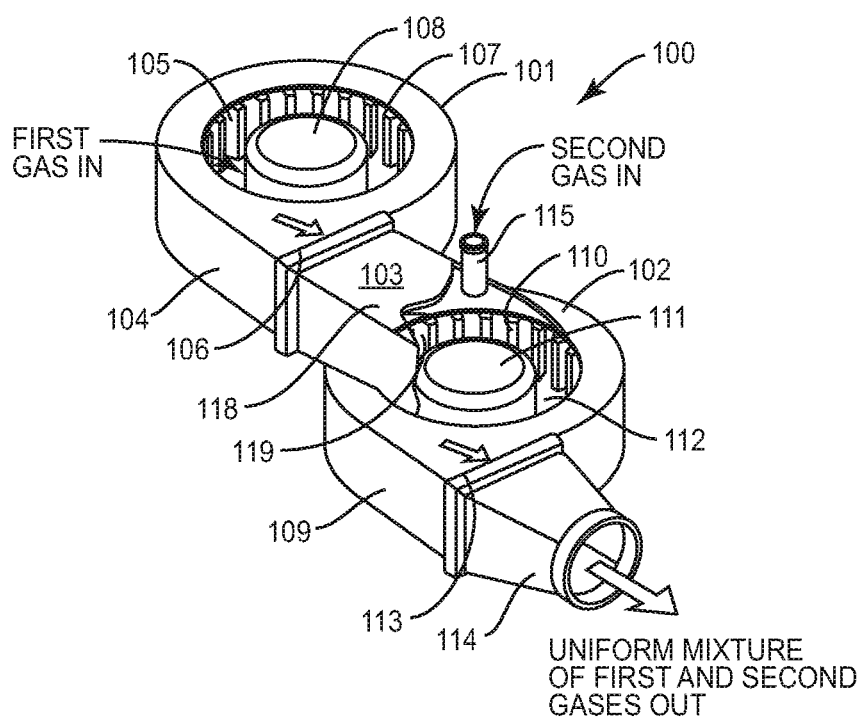
FIG. 1A is a perspective view of a dual blower embodiment of a centrifugal blower system in accordance with the present teachings, the blower being shown in the 0° gas flow configuration with a section of its interconnecting duct component cut away to reveal portions of its duct inlet and the impeller of its second blower unit.

It is to be understood that the present teachings herein are not limited to the particular procedures, materials and modifications described and as such can vary. It is also to be understood that the terminology used is for purposes of describing particular embodiments only and is not intended to limit the scope of the present teachings which will be limited only by the appended claims.

Throughout the specification and claims, where structures, devices, apparatus, compositions, etc., are described as having, including or comprising specific components, or where methods are described as having, including or comprising specific method steps, it is contemplated that such structures, devices, apparatus, compositions, etc., also consist essentially of, or consist of, the recited components and that such methods also consist essentially of, or consist of, the recited method steps.

In the specification and claims, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a structure, device, apparatus or composition, or a method described herein, can be combined in a variety of ways without departing from the focus and scope of the present teachings whether explicit or implicit therein. For example, where reference is made to a particular structure, that structure can be used in various embodiments of the apparatus and/or method of the present teachings.

The use of the terms "include," "includes," "including," "have," "has," "having," "contain," "contains," or "containing," including grammatical equivalents thereof, should be generally understood as open-ended and non-limiting, for example, not excluding additional unrecited elements or steps, unless otherwise specifically stated or understood from the context.

The use of the singular herein, for example, "a," "an," and "the," includes the plural (and vice versa) unless specifically stated otherwise.

Where the use of the term "about" is before a quantitative value, the present teachings also include the specific quantitative value itself, unless specifically stated otherwise. As used herein, the term "about" refers to a ±10% variation from the nominal value unless otherwise indicated or inferred.

It should be understood that the order of steps or order for performing certain actions is immaterial so long as the present teachings remain operable. For example, the methods described herein can be performed in any suitable order unless otherwise indicated herein or otherwise clearly contradicted by context. Moreover, unless steps by their nature must be conducted in sequence, they can be conducted simultaneously.

At various places in the present specification, numerical values are disclosed as ranges of values. It is specifically intended that a range of numerical values disclosed herein include each and every value within the range and any subrange thereof. For example, a numerical value within the range of from 0 to 20 is specifically intended to individually disclose 0, 1, 2, 3, 4, 5, 6, 7, 8, 9, 10, 11, 12, 13, 14, 15, 16, 17, 18, 19 and 20 and any subrange thereof, for example, from 0 to 10, from 8 to 16, from 16 to 20, etc.

The use of any and all examples, or exemplary language provided herein, for example, "such as," is intended merely to better illuminate the present teachings and does not pose a limitation on the scope of the invention unless claimed. No language in the specification should be construed as indicating any non-claimed element as essential to the practice of the present teachings.

Terms and expressions indicating spatial orientation or attitude such as "upper," "lower," "top," "bottom," "horizontal," "vertical," and the like, unless their contextual usage indicates otherwise, are to be understood herein as having no structural, functional or operational significance and as merely reflecting the arbitrarily chosen orientation of the various views of liquid fuel CPOX reformers of the present teachings illustrated in certain of the accompanying figures.

The expression "reformer" as used herein shall be understood as designating a particular type of chemical reactor in which a gaseous reforming reaction mixture is made to undergo gas phase reforming reaction to produce a hydrogen-rich reformate.

The expression "liquid reformable fuel" shall be understood to include reformable carbon- and hydrogen-containing fuels that are a liquid at standard temperature and pressure (STP) conditions, for example, methanol, ethanol, naphtha, distillate, gasoline, kerosene, jet fuel, diesel, biodiesel, and the like, that when subjected to reforming undergo conversion to hydrogen-rich reformates. The expression "liquid reformable fuel" shall be further understood to include such fuels whether they are in the liquid state or in the gaseous state, i.e., a vapor.

The expression "gaseous reformable fuel" shall be understood to include reformable carbon- and hydrogen-containing fuels that are a gas at STP conditions, for example, methane, ethane, propane, butane, isobutane, ethylene, propylene, butylene, isobutylene, dimethyl ether, their mixtures, such as natural gas and liquefied natural gas (LNG), which are mainly methane, and petroleum gas and liquefied petroleum gas (LPG), which are mainly propane or butane but include all mixtures made up primarily of propane and butane, and the like, that when subjected to reforming undergo conversion to hydrogen-rich reformates.

The expression "reforming reaction" shall be understood to include the reaction(s) that occur during reforming or conversion of a reformable fuel to a hydrogen-rich reformate.

The expression "gaseous reforming reaction mixture" refers to a mixture including a vaporized liquid reformable fuel, a gaseous reformable fuel or combinations thereof, an oxidizer, for example, oxygen supplied as air, and for steam or autothermal reforming, steam.

The expression "fuel cell" as used herein shall be understood as designating a device in which an electrochemically oxidizable fuel is made to undergo electrochemical reaction with oxidizing agent to produce an oxidized gas and a flow of electrical current.

Figure 4:
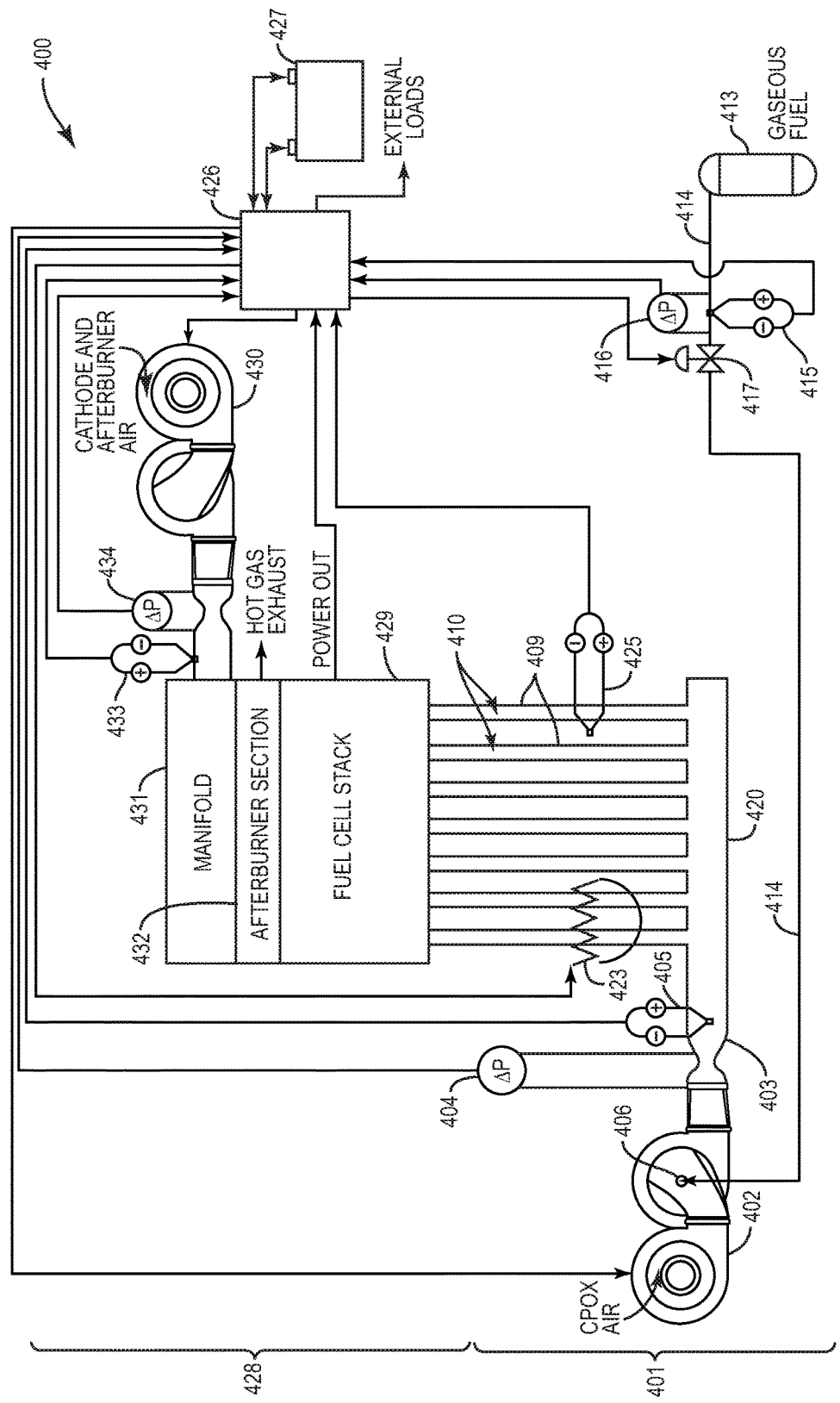
FIG. 4 is a diagrammatic illustration of a chemical reactor in accordance with the present teachings, specifically, an integrated gaseous fuel catalytic partial oxidation reformer and solid oxide fuel cell assembly, incorporating a multiple blower-type centrifugal blower system herein for introducing and driving gas flows therein.

The multiple blower-type centrifugal blower system of this invention can manage gas flow requirements for a variety of gas phase chemical reactors including as aforementioned reformers, integrated reformer-fuel cell systems, fluidized bed reactors for gas phase olefin polymerization, catalytic combustors, gas-liquid circulating gas hydrate reactors, gas phase oxidation reactors and water-gas shift reactors. More particularly, FIG. 4 illustrates the use of the multiple blower-type centrifugal blower system of the invention to provide a gaseous fuel and air catalytic partial oxidation (CPOX) reaction mixture for the gaseous fuel CPOX reformer section of any integrated gaseous fuel CPOX reformer and fuel cell system.

Referring to FIGS. 1A-1D, in one embodiment of centrifugal blower system in accordance with the present teachings, dual centrifugal blower system 100 includes a first centrifugal blower unit 101 connected to a second centrifugal blower unit 102 through duct 103 having a gas flow-confining wall 118 enclosing an internal gas flow passageway 119 and a gas inlet, or port, 115 for admitting a gas into the gas flow passageway.

First blower unit 101 includes a casing 104 having an axial inlet 105, a radial outlet 106 connected to a first end of duct 103, an impeller 107 disposed within casing 104 for drawing a first gaseous medium at a first pressure into axial inlet 105 and expelling gaseous medium at a second higher pressure through radial outlet 106 into gas flow passageway 119 of duct 103, and an electric motor 108 for driving impeller 107.

Second blower unit 102 includes a casing 109 and, as shown by the cutaway section of duct 103 in FIG. 1A, an impeller 110 disposed within casing 109 and driven by electrical motor 111, an axial inlet 112 connected to a second end of duct 103 for receiving first and second gaseous media flowing within gas flow passageway 119, and a radial outlet 113 through which a by-then uniform mixture of first and second gaseous media is expelled into optional gas stream housing 114 and discharged therefrom.

Second gaseous medium is introduced through inlet 115 to gas flow passageway 119 of duct 103 at a pressure that is at least slightly higher than the pressure of first gaseous medium discharged into duct 103 from first blower 101. The first and second gaseous media will undergo some initial mixing within duct 103 the extent of which will depend on the degree of turbulence resulting from the merger of the two gas streams. This initial mixture of first and second gaseous media within duct 103 then enters second blower unit 102 where thorough mixing takes place, the substantially uniform mixture of gases then being discharged from gas stream housing 114 and routed to where needed.

Inlet 115 can, for example, be provided as one or more apertures in the wall of duct 103 or it can extend beyond such wall so as to introduce second gaseous medium further within gas flow passageway 119 of duct 103, for example, at or near the center of gas flow therein. In the case of the latter embodiment, the section of inlet 115 extending into the gas flow passageway can be provided with a streamlined cross section in order to minimize turbulent flow. The section of inlet 115 extending into the gas glow passageway of duct 103 can be oriented in any suitable direction and/or attitude, for example, one which favors a more parallel, and therefore less turbulent, merger of the separate gaseous streams.

The present teachings also contemplate more than one inlet 115 for the admission of one or more additional individual gases into duct 103, for example, a vaporized liquid reformable fuel and/or gaseous reformable fuel through one such inlet and steam through another such inlet to provide an air+fuel+steam reforming reaction mixture for conversion in an autothermal reforming (ATR) reactor and/or steam reforming (SR) reactor to hydrogen-rich reformate.

Where the aforementioned first and second gases are capable of reacting with one another in the presence of an electric spark and/or forming an explosive mixture which can ignite or be detonated by an electric spark, for example, an air and gaseous fuel reforming mixture, the electric motor that drives impeller 110 in second blower unit 102 can advantageously be of the explosion-resistant or gas-sealed variety, various ones of which are conventional or otherwise known, thus minimizing the risk of premature reaction or explosive detonation. Alternatively and as shown in FIG. 1D, motor 116 can be disposed externally to casing 109 of second blower unit 102 and connected to impeller 110 by shaft 117 of suitable length, an arrangement that likewise minimizes the risk of spark-initiated chemical reaction or explosive detonation.

As an example of the operation of centrifugal blower system 100, air as a first gas drawn into first blower unit 101 and methane, propane, butane, natural gas, their mixtures, etc., as a second gas or mixture of gases introduced through inlet 115 into duct 103 initially combine with each other within gas flow passageway 119 of duct 103 and thereafter enter second blower unit 102 where the gases mix together more thoroughly to provide a highly uniform reforming reaction mixture. This reaction mixture is then conveyed to a reformer where it is converted to a hydrogen-rich reformate gas, e.g., as illustrated by CPOX reformer section 401 of integrated gaseous fuel CPOX reformer and fuel cell system 400 illustrated in FIG. 4 and described in detail below.

Figure 1B:
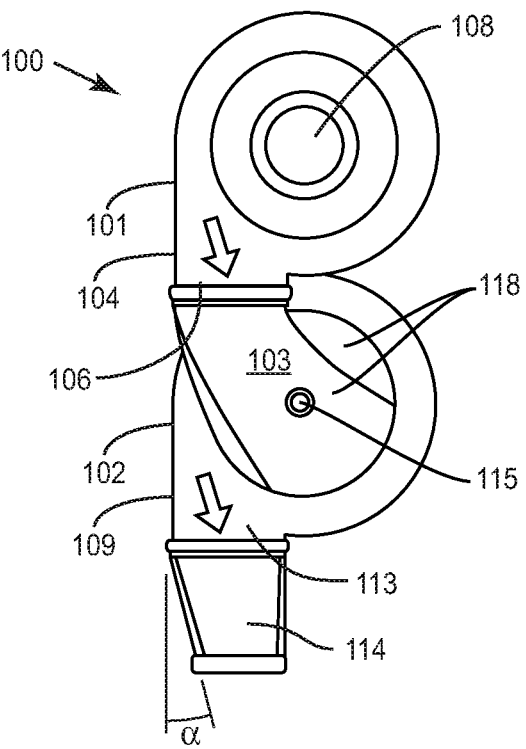
FIG. 1B is a plan view of the centrifugal blower system of 1A.
Figure 1C:
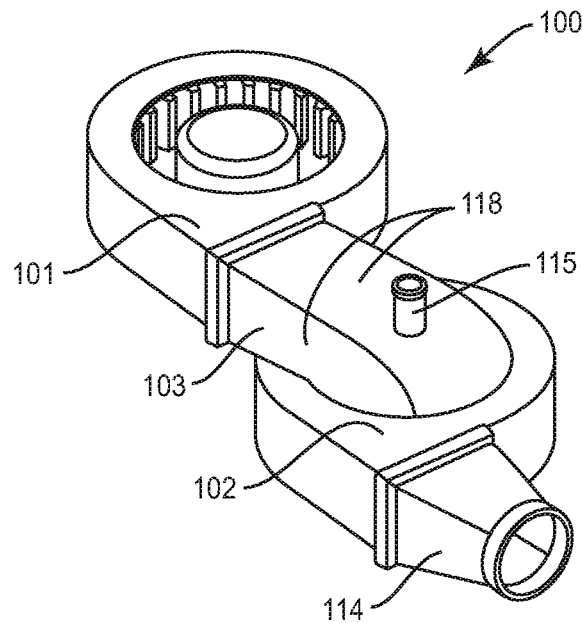
FIGS. 1C and 1D are, respectively, perspective and longitudinal section views of the centrifugal blower system of FIGS. 1A and 1B.
Figure 1D:
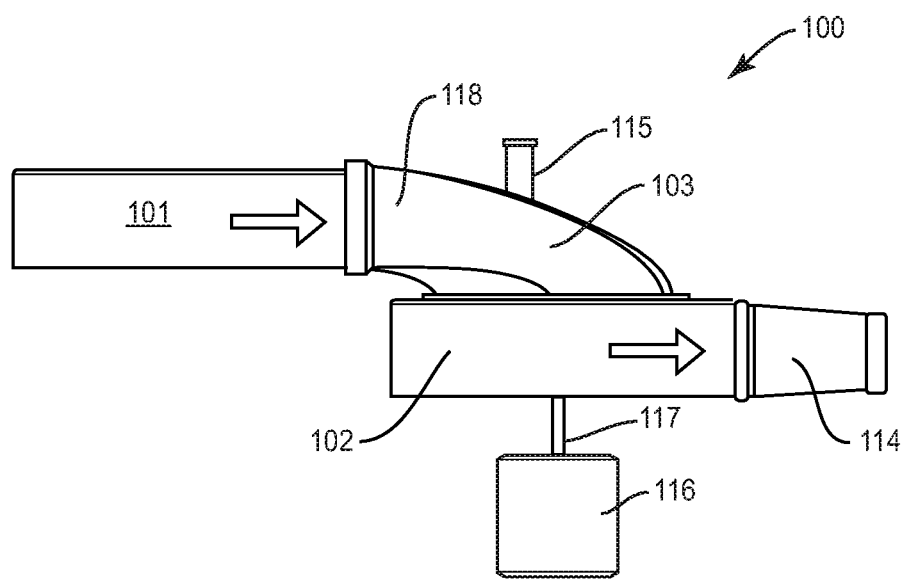

The arrows in FIGS. 1A and 1B indicate the general direction of the gas stream through the radial outlet of each blower unit in the series of blowers constituting centrifugal blower system 100. As shown, for example, in FIG. 1B, the flow of the gas stream expelled through outlet 106 of first blower unit 101 and the flow of the gas stream expelled through outlet 113 of second blower unit 102 are not parallel to their respective outlets but are at some angle thereto. By arranging the geometry of duct 103 to receive the gas stream discharged through outlet 106 in such a manner that the stream remains approximately parallel to the interior walls of the duct, it is possible to prevent or reduce the turbulence that would otherwise occur were the stream to impinge upon these walls. Turbulence is advantageously minimized or avoided so as to reduce or eliminate it as a source of back pressure in the blower system. For this same reason, it is advantageous to arrange the angle of gas stream housing 114 so that its interior walls will be approximately parallel to the flow of the gas stream discharged through outlet 113 of second blower unit 102. The optimum geometry of the interior walls of duct 103 relative to the flow of its gas stream and the angle of offset of gas stream housing 114 can be readily determined for a given gas blower system employing routine experimentation. In the gas blower system shown in FIGS. 1A-1D, interior, or guiding, surfaces of duct 103 and interior, or guiding, surfaces of gas stream housing 114 can be pitched at an angle α of from 12° to 20°, and preferably from 14° to 18°, relative to outlets 106 and 111.

The dimensions, voltage, power draw, impeller speed, air flow, noise level as well as other characteristics of a particular blower unit utilized in the centrifugal blower system of the invention can vary widely depending on gas pressure and gas flow requirements of the gas phase chemical reactor to which it is connected.

FIGS. 2 and 3 illustrate, respectively, a blower control system of a centrifugal blower system of the invention and a diagrammatic representation of its control logic. As those skilled in the art will recognize, these blower control operations can be carried out by a suitably programmed microprocessor.

As shown in FIG. 4, integrated gaseous fuel CPOX reformer-fuel cell system 400 includes gaseous fuel CPOX reformer section 401 coupled to fuel cell section 428. Reformer section 401 includes dual, interconnected centrifugal blower system 402, for example, as illustrated in FIGS. 1A-1D, for introducing a mixture of air and gaseous fuel into conduit 403 and for driving this and other gaseous streams (inclusive of gaseous fuel-air mixture(s) and hydrogen-rich reformates) through the various gas flow passageways of the reformer and fuel cell sections. Conduit 403 can include flow meter 404 and thermocouple 405. These and similar devices can be placed at various locations within a gaseous fuel CPOX reformer section and fuel cell section in order to measure, monitor and control the operation of integrated reformer-fuel cell system 400.

In a start-up mode of operation of integrated gaseous fuel CPOX reformer-fuel cell system 400, a mixture of air and propane at ambient temperature is introduced by centrifugal blower system 402 into conduit 403. The propane is drawn into connecting duct 403 of centrifugal blower system 402 through inlet 406 at relatively low pressure from gaseous fuel storage tank 413 via fuel line 414 equipped with optional thermocouple 415, flow meter 416 and flow control valve 417. The air and propane are thoroughly mixed within centrifugal blower system 402 prior to the gas mixture being discharged therefrom and into conduit 403. The substantially homogeneous propane-air mixture (gaseous CPOX reaction mixture) enters manifold, or plenum, 420 which functions to distribute the reaction mixture more evenly into tubular CPOX reactor units 409.

In a start-up mode of operation of CPOX reformer section 401, igniter 423 initiates the CPOX reaction of the gaseous CPOX reaction mixture within CPOX reaction zones 410 of tubular CPOX reactor units 409 thereby commencing the production of hydrogen-rich reformate. Once steady-state CPOX reaction temperatures have been achieved (e.g., 240° C. to 1,100° C.), the reaction becomes self-sustaining and operation of the igniter can be discontinued. Thermocouple 425 is positioned proximate to one or more CPOX reaction zones 410 to monitor the temperature of the CPOX reaction occurring within CPOX reactor units 409. The temperature measurements can be relayed as a monitored parameter to reformer control system 426.

Reformer section 401 can also include a source of electrical current, for example, rechargeable lithium-ion battery system 427, to provide power, for example, during start-up mode of operation of integrated reformer-fuel cell system 400 for its electrically driven components such as centrifugal blower system 402, flow meter 404, flow control valve 417, igniter 423, and, if desired, to store surplus electricity, for example, produced by fuel cell section 428 during steady-state operation, for later use.

Fuel cell section 428 includes fuel cell stack 429, an afterburner, or tail gas burner, 432, centrifugal blower system 430 for introducing air, evenly distributed by manifold 431, to the cathode side of fuel cell stack 429 to support the electrochemical conversion of fuel to electricity therein and to afterburner 432 to support combustion of tail gas therein, and optional thermocouple 433 and flow meter 434 to provide temperature and pressure measurement inputs to control system 426. Hydrogen-rich reformate produced in gaseous CPOX reformer section 401 enters fuel cell stack 429 and undergoes electrochemical conversion therein to electricity and by-product water (steam) and carbon dioxide as gaseous effluent. This gaseous effluent, or tail gas, from fuel cell stack 429 can contain combustibles gas(es), for example, hydrocarbon(s), unconsumed hydrogen, and/or other electrochemically oxidizable gas(es) such as carbon monoxide, which then enter afterburner 432 where their combustion to water (steam) and carbon dioxide takes place utilizing air provided by centrifugal blower system 430. If desired, heat contained in the hot gas exhaust from afterburner 432 can be recovered and utilized to heat one or more fluid streams, for example, to change water to steam for use in ATR and/or SR reforming.

Although the invention has been described in detail for the purpose of illustration, it is understood that such detail is solely for that purpose, and variations can be made therein by those skilled in the art without departing from the spirit and scope of the invention which is defined in the claims.

What is claimed is:

1. A centrifugal blower system comprising:
    a) a series of blower units including at least a first blower unit and a second blower unit, the first blower unit in the series comprising a first casing having a first axial inlet, a first radial outlet, a first impeller disposed within the first casing for drawing a first gaseous medium at a first pressure into the first axial inlet and expelling the first gaseous medium at a second higher pressure through the first radial outlet into a duct having a gas flow passageway defined by a gas flow-confining wall and a motor for driving the first impeller;
    b) the second blower unit comprising a second casing having a second axial inlet in communication with an outlet of the duct, a second radial outlet, and a second impeller disposed within the second casing for drawing the first gaseous medium into the second axial inlet and expelling a second gaseous medium through the second radial outlet;
    c) a gas flow inlet in communication with the duct, for admitting the second gaseous medium to the gas flow passageway of the duct, the gas flow inlet being defined in or connected to the gas flow-confining wall of the duct, whereby the second gaseous medium, mixes with the first gaseous medium in second blower unit to form a gas mixture.

2. The centrifugal blower system of claim 1 wherein the first gaseous medium is air and the gas flow inlet is connected to a source of fuel capable of forming a reactive and/or explosive mixture with the air which can ignite or be detonated, and the second impeller being driven by an explosion-resistant or gas-sealed electric motor or an electric motor disposed externally to the casing of the second blower unit and connected to the second impeller by a shaft.

3. The centrifugal blower system of claim 1 further comprising:
 a controller for controlling the operation of the blower system.

4. The centrifugal blower system of claim 1 further comprising:
 a gaseous medium directing structure which is at least one of (i) the interior surface of the gas flow-confining wall of the duct being configured to be substantially parallel to the flow of the first gaseous medium expelled from the first radial outlet, or (ii) a gas stream housing for receiving the first gaseous medium and the second gaseous medium being configured to be substantially parallel to the flow of the first gaseous medium.

5. The centrifugal blower system of claim 3 further comprising:
 a gaseous medium directing structure which is at least one of (i) the interior surface of the gas flow-confining wall of the duct being configured to be substantially parallel to the flow of the first gaseous medium expelled from the first radial outlet or (ii) a gas stream housing for receiving the first gaseous medium and the second gaseous medium being configured to be substantially parallel to the flow of the first gaseous medium.

6. The centrifugal blower system of claim 3 wherein the controller controls the operation of at least one blower unit in the series to provide from 50 to 90 percent of the target flow rate of the whole blower system and the operation of at least one other blower unit in the series to provide the balance of the target flow rate of the whole blower system.

7. The centrifugal blower system of claim 3 further comprising:
 a gas flow meter for measuring the flow rate of gas expelled from the centrifugal blower system, the gas flow meter in operation generating gas flow data for input to the controller.

8. The centrifugal blower system of claim 1 wherein the gas flow inlet is formed as at least one opening provided on an end of a gas introducing pipe which is introducing the gaseous medium into the gas flow passageway of the duct, wherein the gas introducing pipe includes a section extending beyond the wall of the duct and into the interior of the gas flow passageway.

9. The centrifugal blower system of claim 8 wherein the section of the gas flow inlet extending into the interior of the gas flow passageway of the duct with a streamlined cross section so as to provide a less turbulent merger of gas streams within the gas flow passageway.

10. A chemical reactor comprising at least one reactor unit having a reaction zone and at least one centrifugal blower system for driving gaseous flow, the centrifugal blower system comprising:
 a) a series of blower units, including at least a first blowers unit and a second blower unit, the first blower unit in the series comprising a first casing having a first axial inlet and a first radial outlet, a first impeller disposed within the first casing for drawing a first gaseous medium at a first pressure in the first axial inlet and expelling the first gaseous medium at a second higher pressure through the first axial outlet into a duct having a gas flow passageway defined by a gas flow-confining wall and a motor for driving the first impeller;
 b) the second blower unit comprising a second casing having a second axial inlet in communication with the duct receiving the first gaseous medium from the first radial outlet, a second radial outlet, a second impeller disposed within the second casing for drawing the first gaseous medium into the second axial inlet and expelling a second gaseous medium through the second radial outlet;
 c) a gas flow inlet in communication with the duct, for admitting the second gaseous medium to the gas flow passageway of the duct, the gas flow inlet being defined in or connected to the gas flow-confining wall of the duct, whereby the second gaseous medium mixes with the first gaseous medium in the second blower unit to form a gas mixture and the centrifugal blower system driving gaseous flow to, within and/or from the reaction zone of the at least one reactor unit.

11. The chemical reactor of claim 10 wherein the centrifugal blower system further comprises:
 a controller for controlling the operation of the blower system.

12. The chemical reactor of claim 11 wherein the controller controls the operation of at least one blower unit in the series to provide from 50 to 90 percent of the target flow rate of the whole blower system and the operation of at least one other blower unit in the series to provide the balance of the target flow rate of the whole blower system.

13. The chemical reactor of claim 10 wherein the centrifugal blower system further comprises:
 a gaseous medium-directing structure which is at least one of (i) the interior surface of the gas flow-confining wall of the duct being configured to be substantially parallel to the flow of the first gaseous medium expelled from the first radial outlet of or (ii) a gas stream housing for receiving the first gaseous medium and the second gaseous medium being configured to be substantially parallel to the flow of the first gaseous medium.

14. The chemical reactor of claim 11 wherein the centrifugal blower system further comprises:
 a gaseous medium-directing structure which is at least one of (i) the interior surface of the gas flow-confining wall of the duct being configured to be substantially parallel to the flow of the first gaseous medium expelled from the first radial outlet or (ii) a gas stream housing for receiving the first gaseous medium and the second gaseous medium being configured to be substantially parallel to the flow of the first gaseous medium.

15. The chemical reactor of claim 11 further comprising:
 a gas flow meter for measuring the flow rate of gas expelled from the centrifugal blower system, the gas flow meter in operation generating gas flow data for input to the controller.

16. The chemical reactor of claim 10 which is a reformer or a reformer connected to a fuel cell.

17. The chemical reactor of claim 10 which is a reformer capable of carrying out partial oxidation reforming, autothermal reforming and/or steam reforming or such reactor connected to a fuel cell.

18. A process for conducting a chemical reaction to produce at least one chemical reaction product, the process comprising:
 driving the flow of a gaseous reaction mixture to, within and/or from the reaction zone of a chemical reactor, the gaseous reaction mixture being driven by a centrifugal blower system comprising:

a) a series of blower units including a first blower unit and a second blower unit, each blower unit in the series comprising a casing having an axial inlet and a radial outlet, an impeller disposed within the casing for drawing a first gaseous medium at a first pressure in the axial inlet and expelling first gaseous medium at a second higher pressure through the radial outlet and a motor for driving the impeller;

b) a duct having a first end connected to the radial outlet of a blower unit in the series, a second end connected to the axial inlet of another blower unit in the series, and a gas flow-confining wall defining a gas flow passageway; and c) a gas flow inlet for admitting a second gaseous medium to the gas flow passageway of duct (b), the gas flow inlet being defined in or connected to the gas flow-confining wall of duct (b), such that upon the admission of second gaseous medium into duct (b) through inlet (c), the first and second gaseous mediums within the gas flow passageway of duct (b) are drawn into the blower unit whose axial inlet is connected to duct (b) and expelled from the radial outlet of such blower unit as a uniform gaseous reaction mixture of the first and second gaseous mediums, the gaseous reaction mixture undergoing reaction within the reaction zone of the chemical reactor to produce at least one chemical reaction product.

19. The process of claim 18 which comprises admitting a flow of vaporized liquid and/or gaseous reformable fuel into duct (b) through inlet (c), the gaseous reformable fuel together with oxygen-containing gas expelled from the radial outlet of the blower unit connected to the first end of duct (b) being admitted to the axial inlet of the other blower unit to which the second end of duct (b) is connected, oxygen-containing gas and reformable fuel undergoing mixing in the other blower unit and discharged from the radial outlet thereof as uniform partial oxidation reaction mixture, the reaction mixture being driven by the centrifugal blower system into the reaction zone of a reformer to produce a hydrogen-rich gas.

20. The process of claim 19 which further comprises combining the vaporized liquid and/or gaseous reformable fuel with steam within the gas flow passageway of duct (b) for conversion within a reformer having autothermal and/or steam reforming capability to a hydrogen-rich gas.

* * * * *